United States Patent [19]

Wilson

[11] 4,184,511
[45] Jan. 22, 1980

[54] CORROSION-RESISTANT SIPHON ASSEMBLY

[76] Inventor: James. Wilson, 18579 Martinique Dr., Houston, Tex. 77058

[21] Appl. No.: 917,086

[22] Filed: Jun. 19, 1978

[51] Int. Cl.² ............... B65D 87/24; F16L 11/08
[52] U.S. Cl. ................... 137/590; 137/152; 137/153; 138/174
[58] Field of Search .......... 137/152, 153, 590; 138/125, 138, 174, DIG. 2, DIG. 7

[56] References Cited

U.S. PATENT DOCUMENTS

| | | | |
|---|---|---|---|
| 2,174,354 | 9/1939 | Shields | 137/590 X |
| 3,177,900 | 4/1965 | Sharp | 138/125 |

Primary Examiner—Gerald A. Michalsky
Attorney, Agent, or Firm—Arnold, White & Durkee

[57] ABSTRACT

An assembly for conveying and discharging corrosive fluids comprising a substantially closed receptacle and a substantially tubular non-metallic corrosion-resistant siphon extending into the receptacle from the outside of the receptacle are disclosed. The siphon tube generally comprises an inner layer of corrosion-resistant resin, a structural layer of unidirectional glass fiber disposed around the inner resin layer, and an outer layer of corrosion resistant resin disposed around the structural layer of unidirectional glass fiber. Methods of making the siphon and using it in its intended environment are also disclosed.

6 Claims, 3 Drawing Figures

CORROSION-RESISTANT SIPHON ASSEMBLY

BACKGROUND OF THE INVENTION

In the past, a traditional method for transporting corrosive fluids such as commercial acids and alkalies was in tank trucks or railroad cars, the insides of which were lined with a corrosion-resistant rubber. These corrosive fluids were removed from the tank cars or trucks through siphons extended into the tanks. These siphons were customarily steel pipe coated with rubber, often 1/16th inch butadiene rubber. These rubber coated siphon tubes were heavy, susceptible to abrasion and unwieldy. They were made only in standard lengths and could not be cut down to fit tank cars other than those for which they were designed, because to do so would destroy the integrity of the rubber coating. Commercial acids in particular are known to contain minute concentrations of organic solvents which will dissolve the rubber coating on the siphon and the rubber lining of the tank and allow the acid to corrode the metal parts of the siphon and tank. The rubber coatings are susceptible to minute pin holes, through which the corrosive fluids carried in the tanks can penetrate to the steel of the tank walls and siphon, thereby causing corrosion. There was also the danger of abuse of such tanks and siphons by users. For instance, railroad cars carrying sulphuric acid would be shipped to their destination, and on the return trip, so as to avoid the transportation of empty tank cars, the shipper would fill the tank cars with acetone or other such organic solvent. The result of such a practice is to ruin the interior of such a tank car, since organic solvents will attack the rubber lining.

Although corrosion resistant resins are known, their use to manufacture siphons for the removal of corrosive fluids from tanks has not been recognized. In particular, there seemed to be no reason to make fiberglass pipe which was corrosion resistant on both the inside and outside surfaces of the pipe. It was further thought that fiberglass pipe was not sufficiently sturdy to be used for tank car siphons.

SUMMARY OF THE INVENTION

The present invention provides an assembly for conveying and discharging corrosive fluids, which comprises the combination of a substantially closed receptacle containing such a corrosive fluid and a substantially tubular non-metallic corrosion resistant siphon. The receptacle has an exit aperture through which the siphon extends from the outside of the receptacle into the fluid contained in the receptacle. The siphon generally comprises an inner layer of corrosion-resistant resin, a structural layer of unidirectional glass fiber disposed around the inner resin layer and an outer layer of corrosion resistant resin disposed around the structural layer of unidirectional glass fiber. One embodiment of the invention provides a wall thickness of the siphon tube of at least 0.375 inches and the unidirectional glass fiber has a tensile strength of at least 30,000 pounds per square inch. The corrosion resistant resin used in the inner and outer layers of the siphon tube may be a vinyl ester thermoset composition. The siphon may comprise a substantially tubular portion having a flange mounted on the outer end of the tubular portion which may be connected with the exit aperture of the receptacle. The invention is particularly adapted for use where the receptacle is a tank for a tank car, tank truck or other such land, sea or air conveyance. The flange on the siphon tube or in an alternative embodiments of the invention engages with a corresponding flange or other means of attachment around the exit aperture of the tank.

The invention also includes the siphon itself, which includes an inner layer of corrosion-resistant resin and an inner corrosion-resistant veil of fabric disposed around the inner resin layer. The inner corrosion-resistant veil is supersaturated with an application of the corrosion-resistant resin used for the inner layer of the siphon. Around the inner corrosion-resistant veil is wrapped a structural layer of unidirectional glass fiber, the fibers of which are oriented longitudinally to the siphon. This unidirectional glass fiber is then covered by an outer corrosion-resistant veil of fabric which has again been supersaturated with the corrosion-resistant resin. Finally, the siphon is provided with an outer layer of corrosion-resistant resin applied to the outer veil. The corrosion-resistant resin layers of siphon tubes in accordance with the invention are applied so as to be impermeable to the corrosive fluid carried within the tank or receptacle.

The invention also provides for a method of use of a siphon tube constructed in accordance with the steps set forth in this specification to remove corrosive fluids from suitable receptacles such as tank cars and tank trucks, as well as the method of manufacture of the siphon tube as described herein.

Principal among the features of the invention is the provision of the combination of a suitable receptacle, such as a tank car or tank truck, and a corrosion resistant non-metallic siphon tube. The tube is relatively easy to fabricate, may be provided in any length as desired by the user to fit the tank to which the siphon is to be fitted, gives substantial advantages over prior siphons in resistance to abrasion and the formation of discontinuities in the siphon which promote corrosion in the siphon tube and is easily handled due to its lighter weight than rubber-lined steel siphon tubes. Other features and advantages of the invention will be apparent from reading the Detailed Description below.

DETAILED DESCRIPTION OF PREFERRED EMBODIMENT

Figure 1:
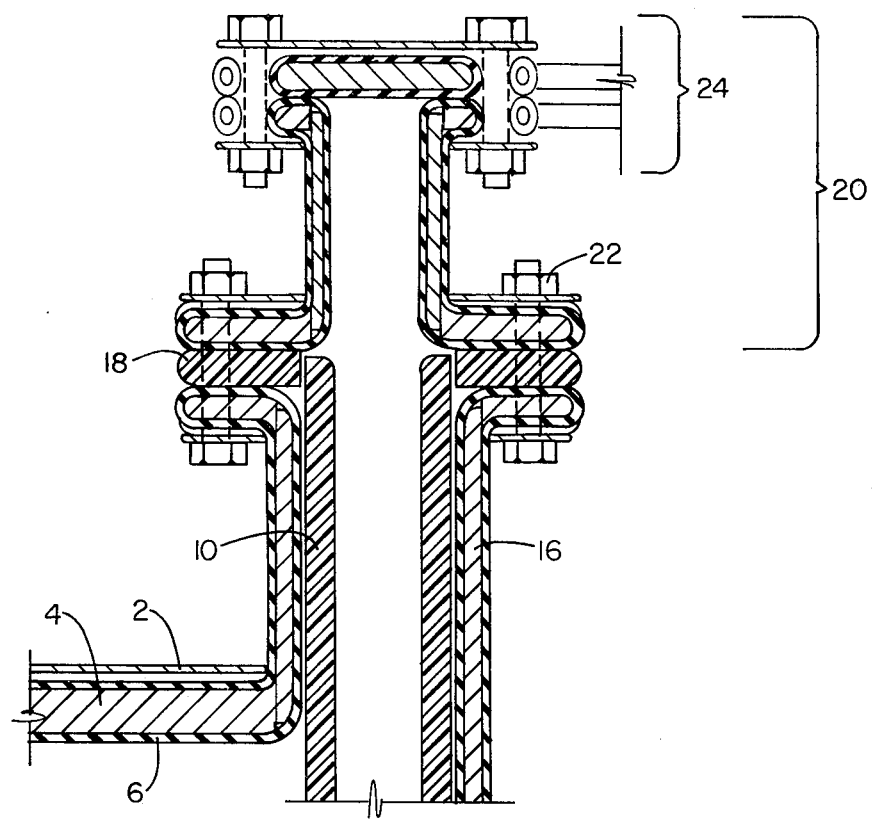
FIG. 1 is a cut-away view of a railroad tank car with siphon tube in place.
Figure 1:
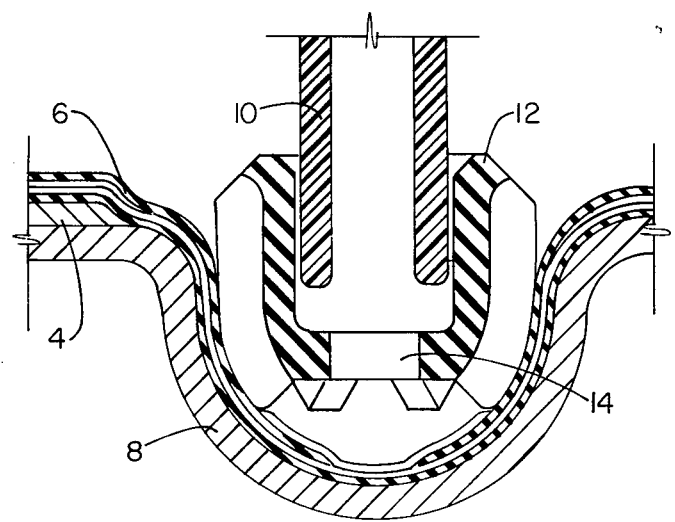

In FIG. 1 is depicted a sectional view of a railroad tank car with siphon tube in place and closed as it is when in use transporting fluids over railroad tracks. The railroad car has an outer metal skin 2, within which is an inner metal liner 4. The outer metal skin on the bottom of the tank car is not depicted in FIG. 1. As can be seen from FIG. 1, the interior of the tank car is provided with a rubber liner 6, which is doubled in the area of sump 8 to provide greater resistance to abrasion when the siphon tube 10 is inserted into the hard rubber sump cup 12. The sump cup 12 fits snugly within the sump 8, and has an inside diameter which will receive the end of siphon tube 10 in a close fit. The bottom of sump cup 12 has an aperture 14, through which fluids may be drawn from the tank car when it is desired to do so at destination. The tank car is provided with a mounting flange 16 suitably affixed to the metal liner 4 of the tank car, which is itself lined with rubber. The mounting flange 16, as well as the siphon tube flange tube 18 and the bottom portion of the flange spool 20 are provided with bolt holes for fastening the respective mounting flange 16, siphon flange 18 and flange spool 20 together when the tank car is in transport. The bolts holding the mounting flange 16, siphon flange 18 and flange spool 20 together are identified by reference numerals 22. The top of the flange spool is sealed during transport by a blind flange 24, which is bolted to a corresponding smaller flange on top of the flange spool 20. When it is desired to discharge liquid from the tank car at the destination, the bolts 22 are removed from the tank car, and the flange spool 20 and blind flange 24 are taken off of the top. A suitable hose and nozzle assembly (not depicted) are then bolted to the top of the siphon flange 18 (attached to mounting flange 16) by means of the bolts 22 and the fluid is drawn from the tank car by conventional siphoning means.

Figures 2, 2A:
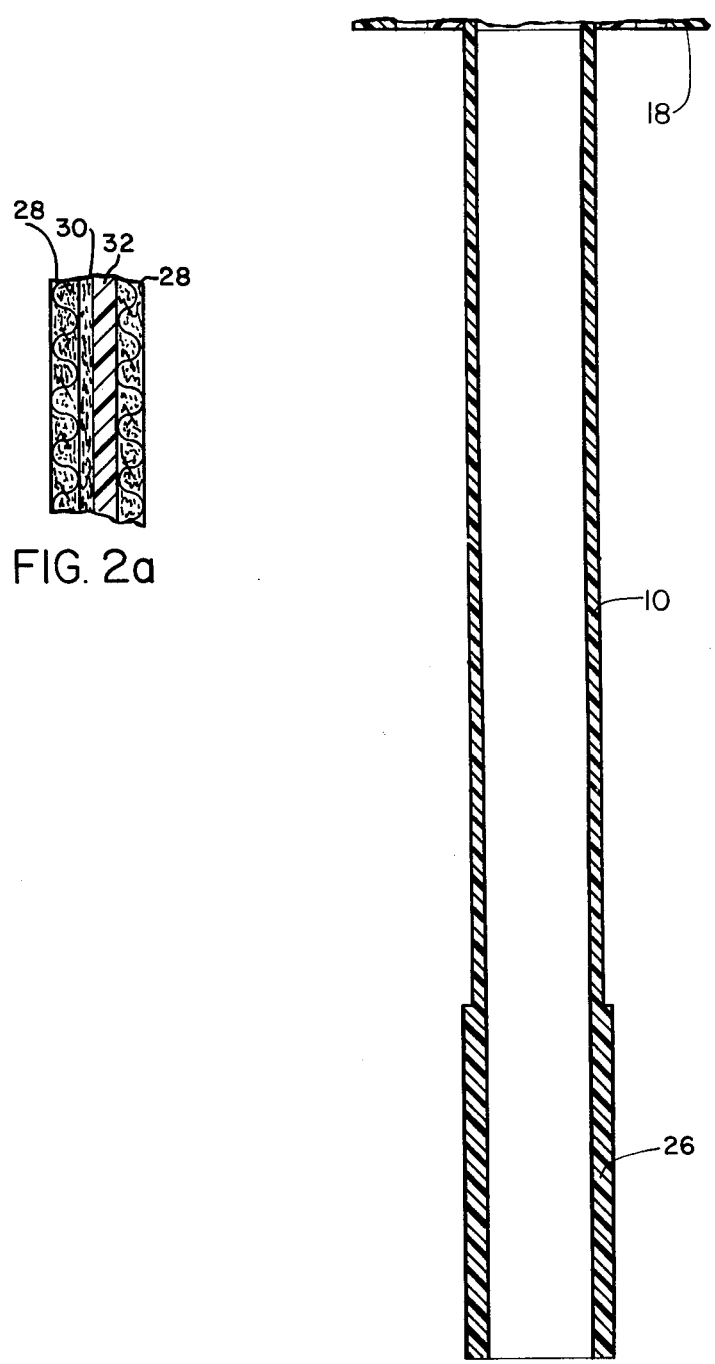
FIG. 2 is a schematic sectional depiction of a siphon tube in accordance with the invention; and, FIG. 2a is a section view of the siphon tube shown in FIG. 2.

In FIG. 2 may be seen the general configuration of the siphon tube 10 and siphon flange 18 in accordance with the invention. Although it is not required to produce a working embodiment of the invention, the end of siphon tube 10 may be provided with a bulbous end portion 26 which fits into the rubber sump cup 12 of FIG. 1. This bulbous end portion 26 may, depending upon the application, add stability to the connection of the siphon tube 10 with the sump cup 12. The siphon has been tested and the results show it to be equally good with or without bulbous end portion 26 in use.

The siphon tube 10 and siphon flange 18 are separately fabricated and assembled after they have been cured. The finished siphon tube 10 is shown sectionalized in FIG. 2a to be a composite of corrosion resistant resin and fabric veil 28, (used to protect the inner and outer structural layer of unidirectional glass fiber from corrosion), a chopped strand mat layer 30 and a unidirectional glass fiber layer 32. The resin employed should be resistant to corrosion by a wide range of inorganic and organic solvents at temperatures up to at least 150° F. While a wide range of resins is suitable, in a preferred embodiment vinyl ester thermoset resins such as Derakane 470 (trademark of Dow Chemical Company) are used. The Derakane 470 resins have typical cured tensile strengths in the range of 11,000 to 12,000 pounds per square inch and may be cured to a Barcol hardness of 40, which is the minimum hardness found to be suitable for the surfaces of siphon tubes for railroad tank cars and tank trucks. In order to protect the unidirectional glass fiber structural layer of the siphon tube from corrosion, a veil of corrosion resistant fabric is employed in layers both inwardly and outwardly of the structural unidirectional glass fiber layer. An example of such a fabric is Nexus 1012 (trademark of Burlington Industries, Inc.), which is a 1¼ denier high modulus polyester staple which may be procured either in "apertured" are "non-apertured" variations. Apertured styles of fabric are somewhat similar to woven fabric in that they appear to have "warp" and "filling". The apertures are the spaces between the warp and filling and can either be diagonal or square in configuration. The non-apertured styles have a smooth and closed structure, somewhat similar to flannel. The Nexus 1012 fabric has a weight of 1.2 ounces per square yard and is 16 mils thick. Nexus fabrics are resistant to a wide variety of chemical agents, such as alcohols, bleaching agents, dry cleaning solvents, halogenated hydrocarbons, hydrocarbons, ketones, soaps and synthetic detergents and aqueous solutions of acids and alkalies at room temperature. It is acceptable to use other veil materials than the Nexus fabrics, so long as the appropriate combination of corrosion resistance and light weight is available. For the structural layer a chopped strand mat of approximately 1½ ounces per square foot in weight is preferred in combination with a unidirectional glass fiber material. The source and composition of the chopped mat is not particularly critical, but it is important for the tensile strength of the finished siphon tube that the structural layer provide a substantial amount of unidirectional glass fibers. In the preferred embodiment the unidirectional glass fiber has a tensile strength of approximately 30,000 pounds per square inch in order to provide acceptable siphon tube strength.

To fabricate the siphon tube 10 itself, a steel pipe of appropriate length and outside diameter is chosen for a mandrel. For railroad tank car applications, this steel pipe mandrel need be no longer than 12 feet in length, inasmuch as the maximum inside diameter of tank cars in use in the United States is 11 feet 4 inches. For railroad tank car use, the finished siphon tube will have an inside diameter of approximately 2 inches and an outside diameter of approximately 3½ inches; these dimensions may, of course, vary with the application. In the embodiment described herein, the pipe has a 2 inch inside diameter and a wall thickness of approximately 470 mils. The steel pipe mandrel is wrapped with a polypropylene film that insures that the finished siphon tube can be drawn off the underlying mandrel when cured. The polypropylene film is covered completely with a layer of resin, around which a layer of Nexus fabric is wound. The Nexus fabric is wetted with resin and is built up to a thickness of approximately 20 mils. Sufficient resin is applied to the Nexus to produce a supersaturated layer composed of between 80 and 90 percent resin. This Nexus-resin layer must upon curing be impermeable to corrosive fluids. The surface of the Nexus polyester fabric veil is then coated with resin to cover all dry spots and to insure that the combined resin and inner Nexus fabric veil is 20 mils thick in all places. Around the veil is wound alternating layers of 1½ ounce chopped strand mat mixed with resin and unidirectional glass fiber mixed with resin. The unidirectional glass should be applied so that the strands run in the longitudinal direction of the tube. These alternating layers are applied to the outside of the siphon tube until the desired wall thickness of about 470 mils is reached. At this point the tube is then coated with the final layer of Nexus fabric and resin so as to form an impermeable outer veil and resin layer. The tube is then cured in an oven at a temperature in accordance with the manufacturer's specifications for the resin. The Barcol hardness of the completed tube should be a minimum of 40, and if necessary, post-curing should be employed to increase the hardness of the siphon tube to the minimum acceptable value. The approximately ½ inch wall thickness of the pipe described as the preferred embodiment herein was chosen to reduce cost and to suppress joint formation in the pipe caused by liberation of heat during the exothermic curing of the resin. The selection of suitable wall thicknesses depending upon the resin composition is within the skill of this art.

The siphon flange 18 may be attached to the siphon tube 10 in several ways. The structural portion of the flange is constructed of layers of chopped strand mat, resin and woven roving of a weight of approximately 24 ounces per square foot. As with siphon tube 10, the outer surfaces of the flange are coated with layers of Nexus fabric veil and corrosion-resistant resin so as to provide an integral layer impermeable to corrosive fluids. In one embodiment, which is depicted in FIGS. 1 and 2, the flange is provided with the hole which snugly fits the outside diameter of the siphon tube 10. The flange is then press fitted onto the end of the end of the siphon tube so that the end of the tube comes to within about ⅛ inch of the top of the flange. The flange then is firmly anchored to the siphon tube with layers of Nexus and resin. The flange may also be wound with a stub extending from the bottom of the flange a short distance. This flange stub has an outside diameter slightly less than the outside diameter of the finished siphon tube portion. The flange is end drilled to the inside diameter of the siphon tube, the end of the pipe which receives the flange is then sanded down to the outside diameter of the flange stub, and the flange and the pipe are attached snugly to one another with layers of Nexus fabric, resin and chopped mat to produce a smooth outside diameter of the pipe extending from the distal end of the pipe through to the flange. The depicted embodiment is preferable for its greater structural strength.

The foregoing description of the invention has been directed to a particular embodiment in accordance with the requirements of the Patent Act and for purposes of explanation and illustration. It will be apparent, however, to those skilled in the art that many modifications and changes may be made without departing from the scope and spirit of the invention. For example, it is obvious from the disclosure that modifications in the disclosed embodiment of the invention necessary to satisfy the needs of any particular application, whether in the choice of resin used, or in the choice of veil fabric or in the precise details of the fabrication process, or in using materials other than those specifically disclosed, are within the state of the art. It is the intention in the following claims to cover all such modifications and variations as fall within the true scope and spirit of the invention.

What is claimed is:

1. An assembly for conveying and discharging corrosive fluids, comprising:
    a substantially closed receptacle containing a corrosive fluid and exit aperture; and,
    a non-metallic corrosive resistant tubular member extending through said aperture into said fluid contained in said receptacle, wherein said member is multilayered with each layer having a plurality of sub-layers including
    a first sub-layer of resin in combination with a veil of corrosive-resistant fabric,
    a second sub-layer of chopped matting material, and
    a third sub-layer of unidirectional fiberglass, having its fiberglass strands applied in a direction longitudinal with the tubular form;
    said sub-layers applied alternatively one on the other, thus forming a multilayered member having a predetermined thickness, and having a final layer of resin in combination with a veil of corrosion-resistant fabric.

2. The assembly of claim 1, wherein the wall thickness of said siphon is at least 0.375 inch.

3. The assembly of claim 1, wherein the tensile strength of the unidirectional glass fiber is at least 30,000 pounds per square inch.

4. The assembly of claims 2 or 3, wherein the resin of said sub-layers is a vinyl ester thermoset composition.

5. The assembly of claim 4, wherein the tubular member further comprises a flange mounted on an end of said tubular member, a portion of which is interconnected with the receptacle at its exit aperture.

6. The assembly of claim 5 wherein the receptacle is a tank adapted to be carried on transport means and wherein the flange of said tubular member engages with a corresponding means for attachment around the exit aperture of said tank.

* * * * *

UNITED STATES PATENT AND TRADEMARK OFFICE
CERTIFICATE OF CORRECTION

PATENT NO. : 4,184,511

DATED : January 22, 1980

INVENTOR(S) : James Wilson

It is certified that error appears in the above-identified patent and that said Letters Patent are hereby corrected as shown below:

Column 2, line 1, delete "or".

Column 2, line 1, delete "embodiments" and insert
--embodiment--.

Column 3, line 58, delete "are" and insert --or--.

Signed and Sealed this

Twenty-fourth Day of June 1980

[SEAL]

Attest:

SIDNEY A. DIAMOND

Attesting Officer     Commissioner of Patents and Trademarks